United States Patent [19]

Iles et al.

[11] 4,222,025

[45] Sep. 9, 1980

[54] RESISTANCE THERMOMETERS

[75] Inventors: Gerald S. Iles; Gordon L. Selman, both of London, England

[73] Assignee: Johnson, Matthey & Co., Limited, London, England

[21] Appl. No.: 948,892

[22] Filed: Oct. 5, 1978

Related U.S. Application Data

[63] Continuation of Ser. No. 660,975, Feb. 24, 1976, abandoned.

[30] Foreign Application Priority Data

Feb. 28, 1975 [GB] United Kingdom ............... 8424/75

[51] Int. Cl.² .............................................. H01C 7/04
[52] U.S. Cl. ....................................... 338/25; 338/28; 338/308
[58] Field of Search .................................. 338/22–25, 338/292, 294, 300, 302, 307–309, 28; 29/612; 252/514; 73/342, 362 AR; 427/101–103, 123–126

[56] References Cited

U.S. PATENT DOCUMENTS

| 1,881,444 | 10/1932 | Flanzer | 338/300 X |
| 3,396,055 | 8/1968 | Hedden et al. | 338/308 X |
| 3,629,772 | 12/1971 | Beightol | 338/28 |
| 3,781,749 | 12/1973 | Iles et al. | 338/292 |
| 3,845,443 | 10/1974 | Fisher | 338/25 |

Primary Examiner—C. L. Albritton
Attorney, Agent, or Firm—Cushman, Darby & Cushman

[57] ABSTRACT

A temperature sensitive element of a resistance thermometer comprising an electrically conductive path formed upon a surface of a cylindrical substrate made from an electrically non-conducting material, said electrically conducting path comprising a layer of fused vitreous material containing an electrically conducting metal selected from the group consisting of gold, silver, platinum, palladium, rhodium, iridium, ruthenium, iron, cobalt, nickel and copper, said element having an outer protective coating made from a glaze.

4 Claims, 5 Drawing Figures

RESISTANCE THERMOMETERS

This is a continuation of application Ser. No. 660,975 filed Feb. 24, 1976, now abandoned.

This invention relates to temperature-sensitive elements of resistance thermometers and to resistance thermometers including such elements.

BACKGROUND OF THE INVENTION

In our U.S. Pat. No. 3,781,749, there is described an electrically resistive element suitable for use as the temperature sensitive element of a resistance thermometer which comprises a layer of fused vitreous material loaded with electrically conducting particles and secured to a substrate of electrically non-conducting material.

Another aspect of the invention described in U.S. Pat. No. 3,781,749 comprises a method of making an electrically resistive element for use as the temperature sensitive element of a resistance thermometer including the steps of applying a layer of a dispersion of electrically conducting particles and powdered vitreous material in an organic medium to the surface of an electrically non-conducting substrate, and heating to drive off the organic medium and fuse the glass. In the earlier invention, the non-conducting substrate may be a wafer of alumina or other heat resistant material. In another embodiment, the element is multilayered and comprises a plurality of super-imposed layers of the said fused vitreous material separated by intermediate layers of dielectric material. Adjacent layers of the fused vitreous material may be interconnected at, for example, one end to form a sinuous electrically conducting path.

SUMMARY OF THE INVENTION

According to the present invention, which is an improvement or a modification of the above described invention, a temperature sensitive element of a resistance thermometer comprises an electrically conducting path formed upon the external and/or internal surface of a tubular or a cylindrical substrate made from an electrically non-conducting material, said electrically conducting path comprising a layer of fused vitreous material containing an electrically conducting phase. The electrically conducting path may follow a sinusoidal, serpentine, helical or zig-zag course, and the substrate may be in the form of a cylindrical tube.

The non-conducting tubular or cylindrical substrate may be made of a ceramic material such as alumina or some other heat resistant material. Alternatively, the substrate may be part of the surface of the body whose temperature it is required to measure.

The electrically conducting phase may be particulate form such as granules, particles, powder, flakes or platelets and may be made from one or more metals selected from the group consisting of gold, silver, platinum, palladium, rhodium, iridium, ruthenium, iron, cobalt, nickel and copper. By suitably adjusting the atmosphere in the firing process by which the vitreous material is fused onto the non-conducting substrate, the various metals can be incorporated into the conducting path, depending upon their oxidation characteristics. The preferred metal is platinum. The form of platinum which we prefer to use is that in which the conducting particles are small flakes or platelets. However, if desired, the conductive phase may be in the other forms previously stated and where a powder is used it may be obtained using precipitation or comminution techniques.

Preferably the layer is formed on the non-conducting substrate by applying a dispersion or metalising ink of, say, platinum flakes and suitable powdered glass in an organic medium and heating so as to drive off the organic medium and fuse the glass powder.

The ink or dispersion may be screen printed onto the cylindrical substrate in the form of a spiral coil either inductively or non-inductively wound. A preferred form is a re-entrant spiral.

Alternative methods of deposition of the conductive particle dispersion on the non-conductive substrate are spraying, with or without the use of a mask and dipping also with or without the use of a mask.

After firing, the conducting film can be formed into a pattern of the required shape by removing areas of film by cutting with a laser beam or the use of a grinding wheel. However, other methods known in the art may be employed such as air-abrasion and use of a laser beam.

Another alternative method of application of the conducting particle dispersion to the non-conducting substrate is by the use of a transfer, preferably a screen printed transfer according to British Pat. No. 1,232,577 which describes the application of a mixture of a vitreous powder and particles of a phosphor to a substrate. In a preferred embodiment, in subsequent firing the organic material forming the substance of the transfer is oxidized away leaving the pre-printed conducting path intact. This method is particularly suitable for curved surfaces such as cylindrical and tubular non-conducting substrates.

BRIEF DESCRIPTION

Embodiments of the invention will now be described, by way of example, with reference to the accompanying drawings in which: FIGS. 1, 2, 3, 4 & 5 show cylindrical tubular substrates bearing differently shaped conducting paths.

DETAILED DESCRIPTION

A suitable formulation for a metallising ink for application to a substrate by printing techniques and incorporating platinum flake is as follows:

| | |
|---|---|
| Platinum Flake | 30.0g |
| Lead boro silicate glass | 3.5g |
| Ethyl cellulose medium | 11.0g |
| Butyl carbitol acetate thinners | 6.0g |
| | 50.5g |

The foregoing formulation was produced by preparing a dispersion of flake platinum and glass flux in ethyl cellulose and, thereafter, the dispersion was ground in a triple rollmill until the particle size was not greater than 6 microns.

For metallizing a substrate by dipping as opposed to printing, the composition can be modified by using methanol (1-10g) in place of the carbitol acetate thinners, in which case the methanol is added after the triple rollmilling step. The purpose of adding the methanol after the rollmilling is to avoid unnecessary evaporation.

Figure 4:
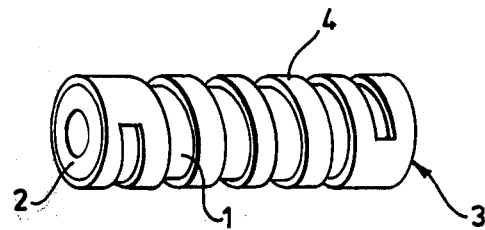

If it is required to apply the metallizing composition by spraying, the composition would again be modified by replacing the methanol with suitable solvents and gelling agents. Referring to FIG. 4, in order to produce an electrically resistive thermometer element by printing, a layer of the metallizing composition containing butyl carbitol acetate thinner was printed using screen printing techniques on to the external surface 1 of a cylindrical tubular alumina substrate 2 as a continuous conductive outer layer 3 of constant thickness. After printing and as described in a British Pat. No. 1,415,644 the substrate was firstly dried by infra-red radiation and then fired at a temperature falling within the range 750° C. to 1300° C. Specifically, good results have been achieved by firing at 1000° C. to 1200° C. for 1 to 4 hours and at 750° C. to 1300° C. for ½ to 8 hours.

Figure 5:
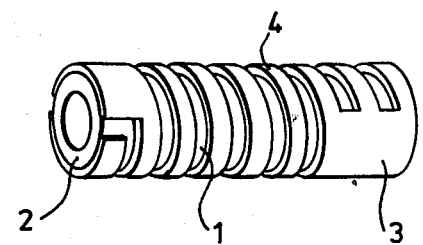

FIG. 4 shows the conductive outer layer 3 in the form of a helical track which may be produced in any known manner. One method of forming the helical track is a modification of a screw-cutting technique in which the printed substrate is mounted in a lathe-like machine with the lathe tool replaced by an appropriately shaped grinding wheel or disc mounted on the tool carrier. The tool carrier, in turn, is supported on a lead screw so that the wheel or disc is traversable parallel to the longitudinal axis of the substance. During operation, the ends of the metallizing tube were electrically connected to an ohm-meter which provided a continuous indication of the resistance of the conductive layer, that is, that part of the layer 3 formed into a helix and the remaining uncut part of the layer. Thus, since a continuous indication of the resistance is available to an operator, cutting of the helical track can be stopped at any predetermined resistance value. Indeed, if required, the circuitry can be designed to include an automatic cut-off when the resistance of the device reaches a predetermined value. FIG. 5 is basically similar to the embodiment of FIG. 4 but with a double helical path, thereby providing a non-inductive device. To achieve the double helical track of FIG. 5 the single disc used in FIG. 4 is replaced by two appropriately spaced discs.

Where the metallizing composition is applied to the substrate by dip-coating, the rate of withdrawal of the substrate from a bath containing the composition is of the order of 2cm per minute. Such a rate of withdrawal results in a relatively uniform coating and to assist in the final production of a coating of uniform thickness the so-coated substrate is slowly rotated during the drying.

Figure 1:
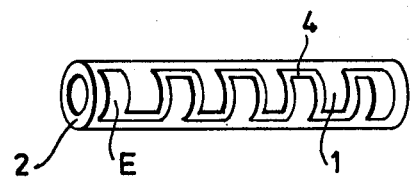
Figure 2:
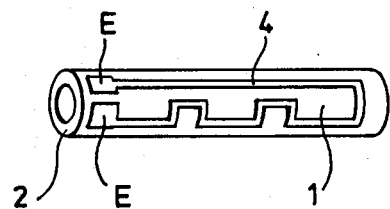
Figure 3:
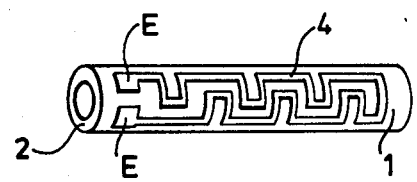

The remaining FIGS. 1, 2 and 3 show different paths while that of FIG. 3 shows a re-entrant and non-inductive arrangement. Although the conductive paths and FIGS. 1, 2 and 3 are shown as occupying about one half of the surface of the substrate, this is for purposes of illustration only and in practice, maximum use would be made of the available surface area.

In each embodiment, the metallizing may be continued over the ends of the tubular substrate either during production of the layer 3 or subsequently. Continuance of the metallizing layer over the ends of the substrate serves to assist in the connection of conductors to the elements of the invention. Where, as in the case of the embodiments of FIGS. 1 to 5, the substrates are shown with a single concentric bore, the metallizing may also be taken into the bore. In such a case, a bead or other shape may be formed on one end of each conductor with the size of the bead such as to form a tight or interference fit within the metallized bore. After insertion of the beads into opposite ends of the bore, electrical connection may be finally effected by bonding the bead into position by additional metallizing composition which was then dried and fired. The bead may be formed from a solid piece of the conductor material or by coiling the end of the conductor. Electrical connection of the conductors may also be made to enlarged areas of the conducting path as shown in FIGS. 1 to 3.

If desired, the substrate may contain two or more bores and patterns or a conductive path may be applied to the surfaces of the bore. Further, in circumstances where it is desired to lead conductors to the devices from one end one conductor may be fed through a bore to the distant end where it is connected, as explained above, to the distant end of the conductive path.

Temperature sensitive elements in accordance with the present invention exhibit stable coefficients of resistivity. By way of example, using a cylindrical tubular substrate of length 25 mm, a diameter of 3 mm, and a platinum conducting path of resistance at 0° C. of 100 ohms we have achieved a temperature coefficient of resistivity of 0.38% degrees centigrade. Furthermore, these properties were found to remain constant within acceptable limits after 2000 hours at 500° C. and after standard endurance tests at temperatures ranging from room temperature to 600° C. after rapid temperature cycling, e.g. 10 cycles between these temperatures.

The following table indicates the change in $R_O$ (normal $R_O$=ohms) at the temperature and for the periods indicated.

| TIME HOURS TEMP °C. | Change in $R_O$ | | | | No. of Samples |
| --- | --- | --- | --- | --- | --- |
| | 500 | 1000 | 2000 | 5000 | |
| 350 | 0.02 ± 0.005 | 0.02 ± 0.005 | 0.02 ± 0.005 | 0.02 ± 0.005 | 70 |
| 600 | 0.035 ± 0.015 | 0.035 ± 0.015 | 0.035 ± 0.015 | 0.03 ± 0.02 | 30 |

The cyclic stability of the device representing the thermal shock resistance of the device is indicated by the following test results:

| Temperature range, from Room temperature to: | Cycles | Change in value of $R_O$ (normal 100 ohms) in ohms | |
| --- | --- | --- | --- |
| +600° C. | 10 | +0.014 | 0.004 |
| −70° C. | 10 | −0.09 | 0.003 |

The results we achieved were found to be within the tolerance laid down in British Standard BS 1094 "Industrial platinum resistance thermometer elements" and the German Standard DIN 43760. The following table indicates the tolerances achieved for three devices A B And C according to the present invention.

| | A | B | C |
| --- | --- | --- | --- |
| $P_O$ (normal 100 resistance) at 0° C. OHMS | 100 ± 0.975 | 100 ± 0.1 | 100 ± 0.5 |
| $R_{100}$ (normal 100 resistance) at 100° C. OHMS | 138.5 ± 0.075 | 138.5 ± 0.2 | 138.5 ± 0.75 |
| Coefficient | 5 | 12 | 12 |

|   | A | B | C |
|---|---|---|---|
| of resistance p.p.m. | | | |

Devices according to the invention were also subjected to toxicity tests by immersing devices in 50 c.c. of Acetic acid for 24 hours and, thereafter, measuring the concentration of toxic metals. The results obtained were below acceptable limits for eating and drinking vessels for Lemons and were:

lead: 3.5 p.p.m.
cadmium: 0.05 p.p.m.
zinc: 1.6 p.p.m.

After formation of the conducting layer 3, firing and formation of the conducting path 4, devices are preferably completed by applying a protective coating of a glaze composition. The glaze composition may be, for example, a composition containing glass and ceramic materials which will not melt and liquify at temperatures at which the device is required to operate, usually 750° C.

We have found that a temperature sensitive element of a resistance thermometer made in accordance with the present invention is useful to register rapidly fluctuating temperatures in a gas stream, e.g. an exhaust gas stream. A temperature sensitive element according to the present invention may be used in a differential thermal probe for use in an over heating warning system or a fuel injection controller in internal combustion or other fuel driven engines as described in our co-pending British Patent Application No. 46591/73.

What we claim is:

1. A temperature sensitive element of a resistance thermometer comprising an electrically conductive path formed upon a surface of a cylindrical substrate made from an electrically non-conducting material, said electrically conducting path comprising a layer of fused vitreous material containing an electrically conducting metal selected from the group consisting of gold, silver, platinum, palladium, rhodium, iridium, ruthenium, iron, cobalt, nickel and copper, said element having an outer protective coating made from a glaze.

2. An element as in claim 1 wherein said metal is in particulate form.

3. A temperature sensitive element of a resistance thermometer comprising an electrically conductive path formed upon a surface of a tubular substrate made from an electrically non-conducting material, said electrically conducting path comprising a layer of fused vitreous material containing an electrically conducting metal element selected from the group consisting of gold, silver, platinum, palladium, rhodium, iridium, ruthenium, iron, cobalt, nickel and copper, said element having an outer protective coating made from a glaze.

4. An element as in claim 3 wherein said metal is in particulate form.

* * * * *